UNITED STATES PATENT OFFICE.

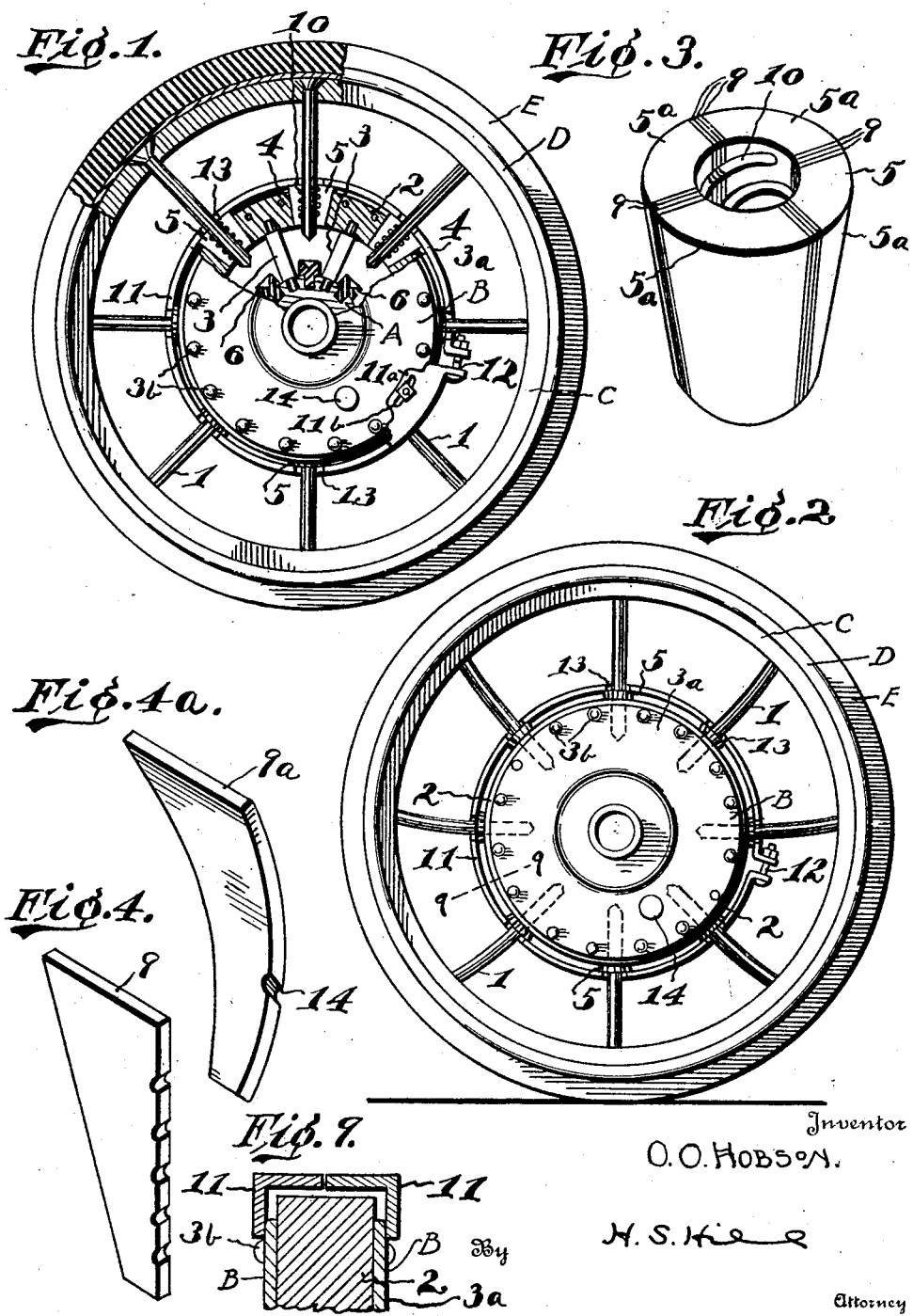

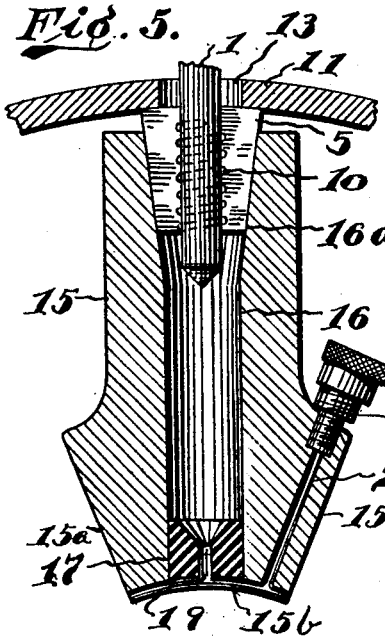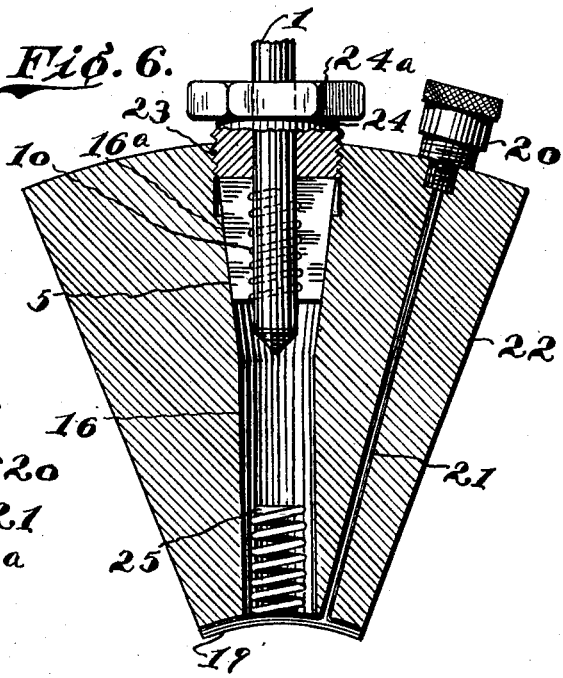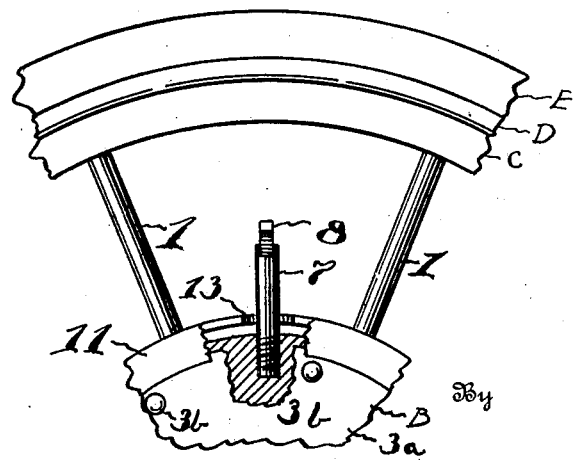

OTA O. HOBSON, OF VINTON, IOWA, ASSIGNOR OF ONE-HALF TO WILLIAM ELLIS FRY, OF VINTON, IOWA.

RESILIENT WHEEL.

1,323,235.   Specification of Letters Patent.   Patented Nov. 25, 1919.

Application filed May 8, 1919. Serial No. 295,598.

*To all whom it may concern:*

Be it known that I, OTA O. HOBSON, a citizen of the United States, residing at Vinton, in the county of Benton, State of Iowa, have invented a new and useful Resilient Wheel; and I do hereby declare the following to be a full, clear, and exact description of the invention, such as will enable others skilled in the art to which it appertains to make and use the same.

The present invention relates to a resilient wheel, and has for its object to provide a device of this character which embodies novel features of construction whereby the wheel felly has a yielding connection with the hub portion, thereby providing for the absorption of sudden shocks and jars and preventing the transmission thereof to the shaft or vehicle.

Further objects of the invention are to provide a wheel of this character which is comparatively simple and inexpensive in its construction, which derives its resiliency from metal parts and is not dependent upon rubber or compressed air, and which can be readily adjusted to compensate for wear upon the parts.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of a spring wheel constructed in accordance with the invention, portions being broken away and shown in section to illustrate more clearly the details of construction.

Fig. 2 is a similar view showing the manner in which the spring spokes of the wheel telescope and flex when a load is imposed upon the wheel.

Fig. 3 is an enlarged detail view of one of the guide sleeves within which the inner ends of the spring spokes telescope.

Fig. 4 is a detail view of one of the shims which are fitted between the sections of the guide sleeves.

Fig. 4$^a$ is a detail view of a modified form of shim.

Fig. 5 is an enlarged detail sectional view showing a modified hub frame construction.

Fig. 6 is a similar view showing a still further modification.

Fig. 7 is an enlarged detail view of a modified form of spring spoke.

Fig. 8 is an enlarged detail view of one of the buffers for the wheel felly, portions being broken away.

Fig. 9 is an enlarged fragmentary sectional view on the line 9—9 of Fig. 2, showing the arrangement of the two split angle iron retaining rings upon the periphery of the hub portion of the wheel.

Corresponding and like parts are referred to in the following description and indicated in all the views of the drawings by the same reference characters.

Referring to the drawings, which illustrate one embodiment of the invention, the reference character A designates the hub, and B a guide frame which extends around the periphery of the hub and is rigid therewith. The wheel rim which is indicated at D carries a series of spring spokes 1 which have a telescoping engagement with the guide frame B of the hub. This conventional rim D and tire E surround a felly C. The guide frame B is susceptible of being constructed in different ways. In Fig. 1 it is shown as including a ring 2 which surrounds the hub B and has a spaced relation thereto and is rigidly connected to the hub by short spoke members 3. The ring 2 is formed at intervals with radially extending and outwardly flared openings 4 within which guide sleeves 5 are seated, the exterior of the sleeves being tapered so that they can be inserted in the flared openings 4 and wedged firmly in position therein. The spring spokes 1 have the outer ends thereof rigidly secured to the rim D, while the inner ends thereof are slidably received within the respective guide sleeves 5. When a load is imposed upon the wheel, the spokes 1 at the lower side of the wheel will be caused to move upwardly through the guide sleeves 5, while the spokes at the upper portion of the wheel will slide outwardly from the guide sleeves, those spokes at the sides of the wheel being flexed, as indicated by Fig. 2, to yieldably support the load. A resilient connection is thus provided between the felly and hub for absorbing sudden shocks and jars.

The hub A is provided at points between the short rigid spokes 3 with yieldable buffers 6 of rubber or like material which will engage the inner ends of the spring spokes 1 when the latter reach the inner limit of their telescoping movements. In a similar manner, a series of radial arms 7 shown by Fig. 8, may project from the ring 2 at points intermediate the spring spokes 1 and terminate in V-shaped buffers 8 of rubber or other suitable material which are adapted to engage the felly C. Provision is thus made for limiting the relative movement of the felly and hub and supporting the parts in such a manner as to prevent breakage in the event there should be an overload upon the wheel.

The tubular guide sleeves 5 are each divided longitudinally into a plurality of similar and complemental sections 5$^a$ which are assembled with thin shims 9 interposed between the same. The inner bore of each guide sleeve is substantially cylindrical in shape to receive the spoke 1, and the walls of the bore may be formed with a suitable lubricant receiving groove 10. A pair of split angle iron retaining rings 11 extend around the periphery of the ring 2, one of the flanges of each of the angle iron rings resting upon the outer ends of the guide sleeves 5 which project slightly beyond the ring 2, while the other flange of each of the angle iron rings fits loosely against the side plates 3$^a$ of the guide frame B. The ends of the split rings are extended outwardly and connected by bolts 12, and the outer flanges of the angle iron rings have their inner edges notched at 13 to provide a clearance space for the spokes 1. The side flanges of the angle iron retaining rings are each provided with a pair of extensions 11$^a$ which are diametrically opposed and slotted at 11$^b$ for loosely engaging certain of the bolts 3$^b$ which are utilized to hold the side plates 3$^a$ in position. One of the side plates may be formed with an oil opening 14 through which lubricant can be inserted into the interior of the hub member. This lubricant will work its way into the guide sleeves 5 as the wheel rotates. By tightening the bolts 12 the split retaining rings 11 can be contracted and pressure brought to bear upon the guide sleeves to force the same tightly in position within their seats. If the guide sleeves 5 become worn, it will be obvious that by removing one or more of the thin shims 9 from each guide sleeve and forcing the guide sleeves more deeply into the flared openings 4, the bores of the guide sleeves can be contracted to compensate for the wear. Instead of imposing a series of thin shims 9 between the complemental sections 5$^a$ of the guide sleeves 5, curved or warped shims 9$^a$, such as are indicated by Fig. 4$^a$, may be substituted. This curved shim 9$^a$ is formed of spring material and has a lubricant notch 14 in one edge thereof to receive and hold lubricant. Where these curved resilient shims 9$^a$ are employed, instead of removing the shims to compensate for wear, the guide sleeves need merely be forced more deeply into the flared pockets in order to bring the sections 5$^a$ thereof more closely together and partially or entirely flatten out the spring shims 9$^a$.

Fig. 5 illustrates a slight modification in which the guide frame B surrounding the hub is formed of a series of blocks 15, said blocks having radial sides 15$^a$ which fit against each other when they are assembled, and curved inner ends 15$^b$ which fit against and are conformed to the shape of the hub A. Each of the blocks 15 is formed with a radial bore 16 having a flared mouth 16$^a$ in which one of the guide sleeves 5 is fitted. These guide sleeves are constructed exactly as previously described, and are held in position by a retaining ring 11. A rubber buffer 17 is provided at the inner end of the bore 16 to engage the inner end of the spring spoke 1 when the latter reaches the limit of its movement. Provision is made for supplying lubricant to the spokes and, as shown in Fig. 5, the inner end of the bore 16 communicates with a groove 19 in the curved inner end 15$^b$ of the block. The grooves 19 of the several blocks communicate with each other to provide an annular lubricant passage extending around the hub, and lubricant may be forced or fed into this groove in any suitable manner, as by means of a grease cup 20, which is fitted in one of the blocks 15 and communicates through a passage 21 with the groove 19.

A further slight modification is shown by Fig. 6, in which blocks 22 of slightly different shape or configuration are substituted for the blocks 15 of Fig. 5. The flared mouth 16$^a$ of the bore 16 of each block terminates in an enlarged cylindrical portion which is interiorly threaded at 23 to receive an adjusting screw 24. These adjusting screws bear against the outer end of the guide sleeves 5 so that by turning the screws inwardly the guide sleeves can be forced downwardly into the flared seats and thereby contracted as previously described. The outer ends of the adjusting screws are formed with polygonal heads 24$^a$ so that these screws can be readily manipulated by a wrench or other suitable tool. In Fig. 6 the buffer at the inner end of the radial bore 16 is in the form of a coil spring 25.

Fig. 7 illustrates a slightly modified form of spring spoke, in which the outer portion of the spoke is flattened at 1ª. This may tend to increase the resiliency of the spoke and yield better results. It will be understood that the spring spokes may be of any desired shape or configuration and that many modifications can be made without departing from the scope of the invention as defined by the allowed claims. The invention has been illustrated and described as embodied in a vehicle wheel, although it will be understood that it can also be used in constructing pulleys or like members where it is desired to interpose a cushioning means between the wheel or pulley and the axle or shaft upon which it is mounted.

It will be understood that the rim can be formed of any suitable material, such as spring steel or iron or mild steel. The spokes may be straight, bent, or curved similar to a letter S or in any analogous manner, and each spoke may be formed of one, or of more laminated leaves. The outer ends of the spokes may be welded, swaged, or otherwise secured and any suitable provision may be made for taking up wear as it develops. The felly may be formed of any suitable material, such as rubber, wood or metal.

Having thus described the invention, what I claim as new and desire to secure by Letters Patent, is:—

1. A spring wheel including a hub, a felly, an annular frame surrounding the hub, a series of guide sleeves fitted in the annular frame and formed in longitudinal sections adapted to be moved toward or away from each other to vary the size of the bore, and resilient spokes slidably mounted within the guide sleeves and connected at their outer ends to the rim.

2. A spring wheel including a hub, a felly, an annular frame surrounding the hub and formed with a series of flared seats, guide sleeves fitted in the flared seats and having tapered outer faces corresponding to the flared walls of the seats, said guide sleeves being divided longitudinally into complemental sections so that the bore can be contracted by moving the sleeves more deeply into the flared seats and bringing the sections thereof more closely together, and a series of radially disposed spring spokes slidably mounted within the guide sleeves and connected at their outer ends to the rim.

3. A spring wheel including a hub, a felly, an annular frame surrounding the hub and formed with a series of seats, tubular guide sleeves fitted within the seats and divided longitudinally into complemental sections, shims fitted between the sections and adapted to be removed to admit of the sections being brought more closely together, and a series of spring spokes slidably mounted within the guide sleeves and connected at their outer ends to the rim.

4. A spring wheel including a hub, a felly, an annular frame surrounding the hub and formed with a series of outwardly flared seats, tubular guide sleeves fitted in the seats and exteriorly tapered to correspond to the inclined walls thereof, said guide sleeves being divided longitudinally into complemental sections, shims interposed between the sections and removable to admit of the sleeves being forced more deeply into the flared seats to contract the sleeves, and a series of radially disposed spring spokes slidably mounted within the guide sleeves and connected at their outer ends to the rim.

5. A spring wheel including a hub, a felly, an annular frame surrounding the hub and formed with a series of flared seats, tubular guide sleeves fitted within the flared seats and exteriorly tapered to correspond to the inclined walls thereof, said guide sleeves being divided longitudinally into complemental sections, shims interposed between the sections and removable to admit of the sleeves being forced more deeply into the flared seats to contract the sleeves, a contractible ring surrounding the annular frame and engaging the outer ends of the tubular guide sleeves to force the same firmly into the flared seats, and resilient spokes slidably mounted within the guide sleeves and connected at their outer ends to the rim.

In testimony whereof I have signed my name to this specification in the presence of two subscribing witnesses.

OTA O. HOBSON.

Witnesses:
W. E. FRY,
W. E. BICKEL.